May 7, 1929. W. C. H. WEFEL 1,711,862
TROLLEY WIRE CONTACT
Filed Oct. 27, 1925
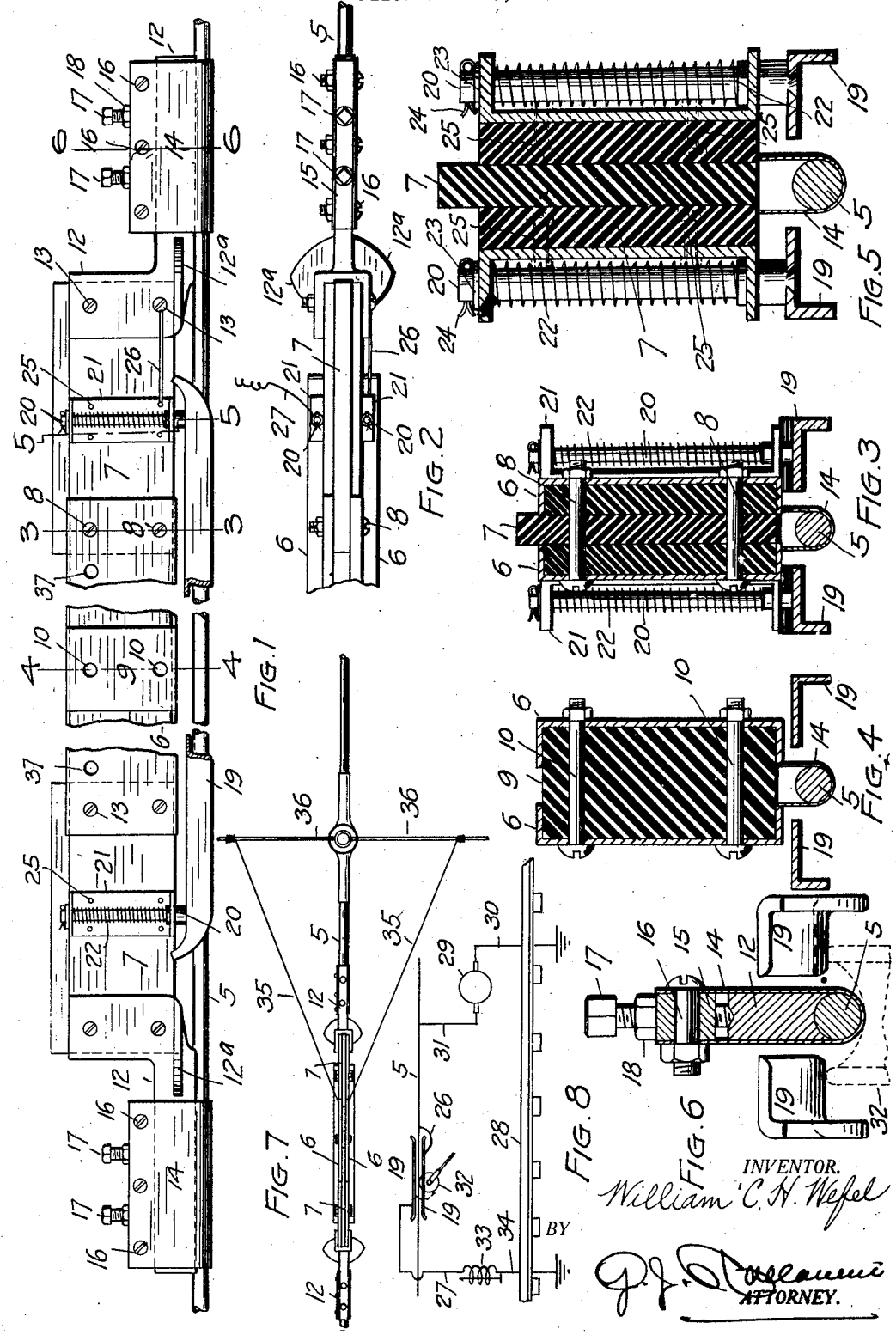

Patented May 7, 1929.

1,711,862

UNITED STATES PATENT OFFICE.

WILLIAM C. H. WEFEL, OF EDGEWATER, COLORADO.

TROLLEY-WIRE CONTACT.

Application filed October 27, 1925. Serial No. 65,136.

My invention relates to contact attachments for trolley wires of electric railways, and an object of the invention resides in the provision of a simple arrangement of parts in a device adapted to be fastened lengthwise of the trolley wire, which by the engagement of a trolley wheel on a passing car, will cause completion of a circuit in which the trolley wire is a conductive element.

Another object of the invention is to provide an efficient and readily adjustable appliance for fastening the contact device in its operative relation to the trolley; a further object resides in providing a contact device of the above described character adapted for operation by the engagement of a trolley wheel, as well as by the passage of a pantograph contact shoe of the type frequently used on fast-moving cars of electric railways to collect current from the overhead wires between different towns and cities or other distant points, and still other objects will be found in details of construction and novel arrangements and combinations of parts as will fully appear in the course of the following description.

A preferred embodiment of the invention has been illustrated in the accompanying drawings in which similar characters of reference designate corresponding parts throughout the several views, and in which Figure 1 represents a fragmentary side elevation of the improved contact attachment in its operative position with relation to the trolley wire of an electric railway;

Figure 2, a plan view of an end portion of the device illustrated in Figure 1;

Figure 3, an enlarged cross section along the line 3—3, Figure 1;

Figure 4, a correspondingly enlarged cross section taken on the line 4—4, Figure 1;

Figure 5, a further enlarged section in the plane indicated by the line 5—5 in Figure 1;

Figure 6, a similarly enlarged section along the line 6—6 in Figure 1;

Figure 7, a diagrammatic plan view on a reduced scale of the arrangement of the contact attachment relative to the trolley wire and a span wire of an overhead electric railway system; and Figure 8, a diagrammatic view of a circuit, the current flow through which is controlled by the contact device of the present invention.

Referring further to the drawings, the numeral 5 designates a trolley wire or other similar overhead conductor, of an electric railway, to which the contact device is attached by means of clamps applied at opposite ends thereof. The contact device extending in practise longitudinally of the trolley wire, comprises two side-bars 6 preferably formed of channel metal and spaced apart in insulated relation to each other by shank-members 7 of non-conducting material rigidly fastened at their ends.

The shank-members are preferably composed of three sections of even lengths, the middle one of which is wider than the outer ones and projects above the same for the main purpose of preventing short-circuiting between the metal side bars by moisture collecting upon the upper edges of the insulating shanks, it being apparent that the projecting portion of the middle section of the member will shed the water along its vertical sides, and thereby prevent of its becoming a conducting medium between the outer members with which the metal side bars engage.

The channel-shaped side bars of the device embrace the outer sections of the composite shank-members at the inner ends thereof, and the parts thus assembled are rigidly fastened together by bolts 8. The structure so far described may be reinforced by a block 9 fitted between the bars intermediate of the shanks and fastened in place by bolts 10.

The shank-members 7 function as a connecting medium between the body-portions of the contact device represented by the spaced and interconnected bars 6, and angular metal end-pieces 12 by which the device is fastened on the trolley wire.

The end-pieces are supported upon the trolley wire; their lower edges are concaved to fit the wire, as best shown in Figure 6, and they are rigidly attached at the outer ends of the shanks by means of bolts 13. The end-pieces are to this end provided with vertical channels to admit the end-portions of the non-conductive shanks, as best shown in Figure 2.

Wings 12$^a$ projecting horizontally at opposite sides of the end-pieces, guard the contact-shoes hereinafter to be described, against injury by contact of the trolley pole in the event of the trolley wheel jumping the wire upon its approach to the contact device.

The contact device is secured upon the trolley wire by clamps, each consisting of a yoke 14 embracing the trolley wire and the end-pieces 12 of the device, a filler-block 15 fitted between the sides of the yoke and fastened in place by screw-bolts 16, set screws 17 extending through threaded holes in the block and engaging the upper edges of the end-pieces to clamp the latter upon the trolley wire, and lock-nuts 18 which hold the set-screws in their adjusted positions.

The non-conducting shanks of the device function furthermore for the attachment of contact rails in insulated relation to each other.

The rails 19 which are of angle-section, extend longitudinally of the body-portion of the device at opposite sides of the trolley wire, their ends flare upwardly to provide an entrance for the trolley wheel, and they are vertically yieldably mounted by means of suspension pins 20 which extend upwardly from their ends through alined openings of parallel flanges on brackets 21 fastened to the shanks.

Coiled springs 22 between the upper flanges of the brackets and shoulders at the lower ends of the pins yieldingly resist upward motion of the contact rails, and thereby insure their frictional contact with the trolley wheel, and washers 23 and split cotter pins 24 at the upper extremities of the pins, limit the downward movement of the rails and support them in their normal suspended position.

The brackets 21 are secured to the outer sections of the composite shank-members 7 of the device by headed bolts 25 in countersunk holes of the sections and therewith registering apertures of the brackets, and nuts screwed upon the protruding ends of the bolts.

It will be apparent that by the arrangement shown and hereinabove described, the two contact rails are insulated from each other to serve as members of a switch or circuit breaker, the gap between which is bridged by the trolley or other current-collector of a railway car when it passes the point on the trolley wire at which the device is applied.

One of the rails is, with this purpose in view, placed in electrical connection with the trolley wire by means of a bond-wire 26 which connects one of the brackets on which the rail is mounted with the adjacent metallic end-piece by which the device is supported on the trolley wire, and the contact rail at the opposite side of the device is by means of a conductor 27 fastened to one of its brackets, connected in the circuit of the electrical instrument to be operated by the engagement of the trolley wheel with the rails.

The device is especially adapted for use in the operation of signaling instruments at curves, switches, and stations of an electric railway system, and it is of particular value in that it permits of including a side of the car-motor circuit in the circuit of the signaling instrument as illustrated in Figure 8, in which the ground is represented by one of the rails 28 of the railway track. The operating circuit of the railway includes, commencing with the generator 29 or other source of electricity, a conductor 30 connecting a pole thereof with the ground, and a second conductor 31 by which the opposite pole of the generator is connected with the trolley wire 5. The trolley wheel 32, contacting with the wire 5, conducts the current to the motor of the car, which through the medium of the wheels of the same is likewise connected with the ground. A signal or other instrument to be operated by the engagement of the trolley wheel with the rails 19 of the contact device, is represented by the solenoid coil 33, one end of which is connected with one of the rails 19 by the before-mentioned conductor 27, and the other end of which is connected with the ground by means of a conductor 34.

It will be apparent that when the trolley wheel or other current-collector of the car, bridges the gap between the conductive rails 19, the circuit of the signal instrument 33 is completed as follows: Beginning at the generator 29, the conductor 31, the trolley wire 5, the bond 26 connecting the trolley wire with one of the rails 19 of the contact device, the rail to which the bond is attached, the trolley wheel, the opposite rail 19 of the device, the conductor 27 connected to one of the brackets of the rail, the solenoid 33 of the signal, the conductor 34, the ground, and the conductor 30 leading to the generator.

By the arrangement shown and described, the circuit of the instrument remains closed as long as the trolley wheel engages the contact rails, whether or not the wheel is in engagement with the trolley wire, and in case the car is equipped with a contact shoe of the pantograph type, the downwardly extending flanges at the outer edges of the angle-shaped rails will cause the shoe to bridge the gap between the rails as efficiently as the trolley wheel riding along the flat horizontal portions of the rails between their flanges.

The wings 12ª on the end-members of the device protect the rails 19 against damage by contact of the trolley pole in case the trolley jumps the wire, as mentioned hereinbefore, and the flaring extremities of the rails provide a ready entrance for the trolley wheels at either end of the device.

If the contact attachment is applied in adjacency to one of the span wires by means of which the trolley wire is suspended from the poles, it may be braced by a wire 35 fastened to the span wire 36 at opposite sides of the trolley wire, and stretched through apertures 37 in the side members of the body-portion of the device, as illustrated in Figure 7.

Having thus described my invention, what

I claim and desire to secure by Letters Patent is:

1. The combination with a supply conductor of an electric railway, of a contact device having insulated contact members, an electric connection between one of the members and the supply conductor, and a circuit having a terminal in the other member, the contact members being movable relative to the supply conductor, so that a current collector may engage simultaneously the two contact members or the two contact members and the supply conductor.

2. The combination with an overhead supply conductor of an electric railway and a span wire by which the conductor is suspended, of a contact device mounted on the conductor, and a wire for bracing the device by connection with the span wire.

3. A contact device for a supply conductor of an electric railway comprising a body-member, having means for its support in operative relation to the conductor, and contact-members insulated from each other and mounted on the body-member to yieldingly move in vertical direction relative to the conductor.

4. A contact device for a supply conductor of an electric railway comprising a body-member, having means for its support in operative relation to the conductor, brackets on the body-member, contact-members suspended from the brackets to move in vertical direction, and springs to yieldingly resist the upward movement of the contact-members.

5. A contact device for a supply conductor of an electric railway comprising a body-member, conductive means for its support on the conductor, insulated contact-members movable on the body-member, an electric connection between one of the members and said conductive means, and a separate conductor of electricity connected with the other member.

6. A contact device for a supply conductor of an electric railway comprising a body-member, non-conductive shanks at the ends thereof composed of a plurality of sections, end-pieces connected to the shanks, means on the end-pieces to mount the device in operative relation to the conductor, brackets fastened to the outer sections of the composite shanks, and contact members suspended from the brackets.

7. A contact device for a supply conductor of an electric railway comprising a body-member, composite non-conductive shanks at the ends thereof, each including a middle section extending above the outer sections, end pieces connected to the shanks, means on the end-pieces to mount the device in operative relation to the conductor, brackets fastened to the outer sections of the composite shanks, and contact members suspended from the brackets.

8. A contact device for a supply conductor of an electric railway comprising a body-member, means thereon for fastening the device in operative relation to the conductor, contact rails suspended from the body-member, and protective wings on the body-member, forward of the contact-rails.

9. A contact device for a supply conductor of an electric railway comprising a body-member, end-pieces adapted to seat the body-member upon the conductor, yokes embracing the end-pieces on the conductor, clamping screws on the yoke to urge the end-pieces to engagement with the conductor, and contact-members mounted on the body-member.

10. A contact device for a supply conductor of an electric railway comprising a body-member, non-conductive shanks at the ends thereof, contact members mounted on the shanks, end-pieces connected to the shanks, means on the end-pieces for fastening them upon the conductor, and protective wings on the end-pieces at opposite ends of the contact-members.

11. A contact device comprising in combination with a supply conductor of an electric railway, a body member fastened to the conductor, and vertically movable contact rails on the body member, normally extending below the horizontal plane of the conductor and disposed to be bridged by a current collector on a railway car.

12. A contact device comprising in combination with a supply conductor of an electric railway, a body member fastened to the conductor, and spaced electric contact members on the body member, disposed to be bridged by a current collector on a railway car, the contact members being movable so that a current collector can simultaneously engage the two contact members or the contact members and the supply conductor.

In testimony whereof I have affixed my signature.

WILLIAM C. H. WEFEL.